Dec. 14, 1926.
A. H. HUMPHREY
1,610,447
LICENSE PLATE UNIT
Filed Dec. 15, 1925
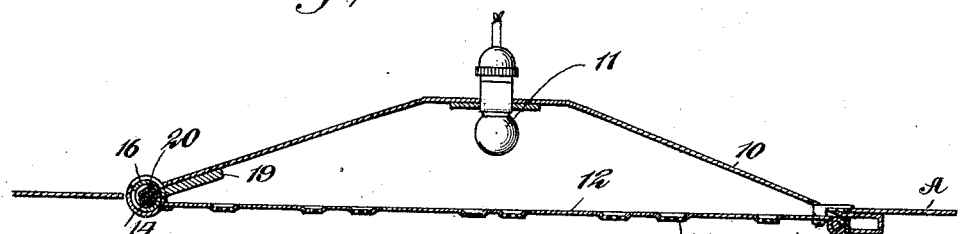
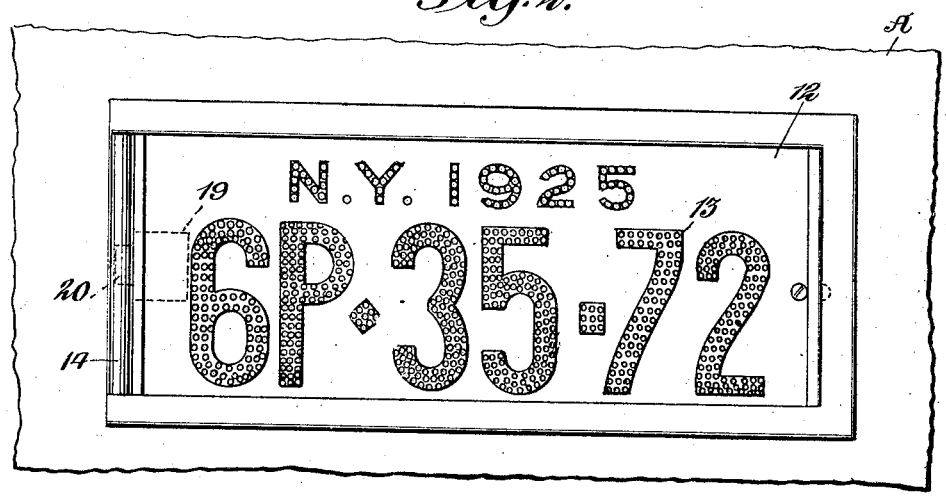
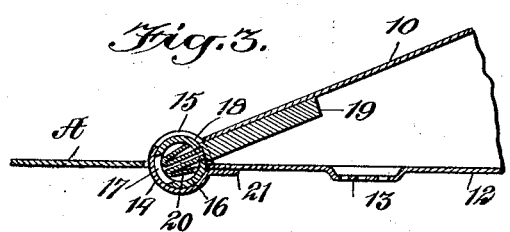
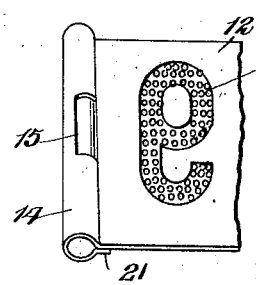
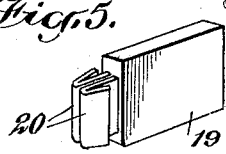
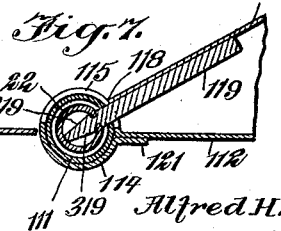
WITNESSES
INVENTOR
Alfred H. Humphrey
BY
ATTORNEYS Patented Dec. 14, 1926.

1,610,447

UNITED STATES PATENT OFFICE.

ALFRED HORATIO HUMPHREY, OF SALEM, NEW YORK.

LICENSE-PLATE UNIT.

Application filed December 15, 1925. Serial No. 75,593.

My invention relates to license plates, particularly to a hinged license plate mounted on a casing adapted, in practice, to be illuminated for increasing the visibility of the perforated characters, letters and numbers of the license plate.

The general object of my invention is to provide a hinged license plate characterized by an inseparable connection between the hinge elements and of such a character as to require the plate to be mutilated or destroyed in order to be removed. The stated object of the present application is in common with the stated object in an application filed by me December 8, 1925: Serial Number 74,105.

The present invention has for its special object to provide a novel hinge connection between the license plate and the casing or equivalent support whereas the co-pending application referred to covers a different species of a hinge connecting means and relates broadly to the generic features common to the two applications in question.

Reference is to be had to the accompanying drawings forming a part of this specification, it being understood that the drawings are merely illustrative of practical examples of the invention.

Figure 1 is a horizontal section taken through a license plate unit embodying my present invention;

Figure 2 is a face view of said license plate unit;

Figure 3 is an enlarged detail in cross section, the section being given to better show the hinge connection;

Figure 4 is a reverse view inverted of that portion of the hinge connection rigid with the face plate, an integral portion of said face plate being included;

Figure 5 is a perspective view of that member of the hinge which is made rigid with the casing;

Figure 6 is a perspective view of the tubular hinge pin;

Figure 7 is a view similar to Figure 3 but illustrating another form of the hinge connection.

My improved license plate unit in the illustrated form includes a casing 10 having in the rear thereof a lamp 11 or other source of light. The numeral 12 indicates a license plate provided at the front of the casing 10 and having perforated letters 13 illuminated from the back by the source of light 11.

The casing 10 is secured to any available part A of an automobile where the license plate is to be mounted.

The material of the plate 12 is bent to form an exterior tubular hinge element 14 having a side opening 15. Said tubular hinge element 14 receives within the same a separate tubular pin 16 having diametrically opposite openings 17, 18 of which one is wider than the other as shown clearly in Figure 6.

A hinge element 19 is welded or otherwise permanently fastened to the material of the casing 10 and projecting from said element 19 is a pair of compressible hook-like members 20 which are adapted to be passed successively through the smaller opening 18 and to lie adjacent to the larger opening 17. Said members 20 are resilient and are forced through the opening 18 to lie within the pin 16. The external hinge element 14 on the license plate 12 is turnable about the pin 16 having the member 20 therein. The turning of element 14 about the pin 16 is permitted by reason of the opening 15 which accommodates the members 20 at the base thereof adjacent to the welded element 19.

The member 14 which is formed on the license plate 12 is welded at its terminal edge 21 to the body of the face plate 12 and since the pin 16 is held by the members 20 which are rigid with the welded element 19, the hinge parts are maintained inseparable except by destruction or multilization of the parts. With the destruction of the hinge element 14 of license plate 12 by cutting the same away or removing with the aid of a torch, the opening 17 will be accessible for the entrance of a pinchers whereby the members 20 may be compressed so that they may be removed through the opening 18. Thus, an authorized person by destroying the license plate at the hinge may substitute a new license plate using the same elements 16, 19 and 20.

In Figure 7 the casing 110 has a license plate 112 formed with a hinge member 114 welded at 121 as in the first-described form.

A tubular pin 116 having a side opening 118 corresponding with the opening 18 is inserted in the member 14. Within the tubular pin 116 is placed a spring 22 in the form of a split band and a member 119 welded to the casing 110 is formed with a tapered end 219. Said tapered end 219 may be inserted through the opening 115 in the member 114 through the opening 118 and then forced laterally into the spring 22 at the split portion thereof. Said welded element 119 adjacent to the tapered end 219 has depressions 319 to receive the edges of the resilient split band 22. Thus, the form shown in Figure 7, like the first-described form, requires the destruction of the face plate in order to remove the same or in order to separate the hinge parts.

I would state furthermore that while the illustrated examples constitute practical embodiments of my invention, I do not limit myself strictly to tne exact details herein illustrated since manifestly, the same can be considerably varied without departure from the spirit of the invention.

Having thus described my invention, I claim:

1. A license plate unit including a license plate, supporting means for the license plate, a hinge element formed from the material of said license plate at an edge thereof, a tubular hinge pin in said hinge element on the license plate, an element constituting an inseparable part of said supporting means, and having a portion thereof adapted to be entered laterally through the hinge element of the license plate and through said tubular hinge pin and held against withdrawal from the interior of the hinge pin.

2. A license plate unit including a casing, a license plate on said casing, a tubular hinge element on the license plate, a pin fitting in said tubular element and having a lateral opening, and means on said casing passing through said opening into the pin and held against withdrawal to maintain the license plate and its supporting means in hinged relation.

3. A license plate unit including a casing, a license plate on said casing, a tubular hinge element on the license plate, a tubular pin fitting in said tubular element and having a lateral opening, and means on the casing and extending through said tubular hinge element of the license plate to the interior thereof and held against withdrawal, said tubular element of the license plate enclosing and making inaccessible said means on the casing to require the destruction of said tubular element of the license plate to afford access to said means on the casing.

ALFRED HORATIO HUMPHREY.